United States Patent
Massie

[15] 3,640,154
[45] Feb. 8, 1972

[54] AXIAL GEAR TRAIN

[72] Inventor: Philip E. Massie, 4220 Irving Pl., Culver City, Calif. 90230

[22] Filed: Sept. 11, 1970

[21] Appl. No.: 71,306

Related U.S. Application Data

[63] Continuation-in-part of Ser. No. 822,462, May 7, 1969, Pat. No. 3,587,349.

[52] U.S. Cl. ..................................74/800, 74/757
[51] Int. Cl. ...............................................F16h 1/28
[58] Field of Search ...........................74/800, 757

[56] References Cited

UNITED STATES PATENTS

| | | | |
|---|---|---|---|
| 2,953,944 | 9/1960 | Sundt | 74/800 |
| 3,085,451 | 4/1963 | Morin | 74/800 |
| 3,385,135 | 5/1968 | Strandberg | 74/800 |
| 3,387,688 | 6/1968 | Yoshihara | 74/800 |
| 3,587,349 | 6/1971 | Massie | 74/800 |

*Primary Examiner*—C. J. Husar
*Attorney*—Herzig & Walsh

[57] ABSTRACT

The device is an axial gear train or transmission for purposes of effecting a change of speed such as a substantial reduction in speed. A member having gear faces is mounted on a skew axle driven by a drive shaft; one gear face meshes with a nonrotating gear face. The other gear face meshes with a gear face on a driven shaft. The gear faces on the skew axle nutate or gyrate with the point of contact between meshing gear faces rotating. The skew axle is offset from the axis of the driving and driven shafts and the nutating gear faces are axially spaced from each other. The centers of the nutating gear faces are displaced radially from the axis of the driving and driven shafts. Gear trains for providing any desired speed ratios can be designed based on the parameters which are the number of teeth on respective gear faces; the axial spacing of the nutating gear faces; and the radial displacement of the centers of the nutating gears.

12 Claims, 6 Drawing Figures

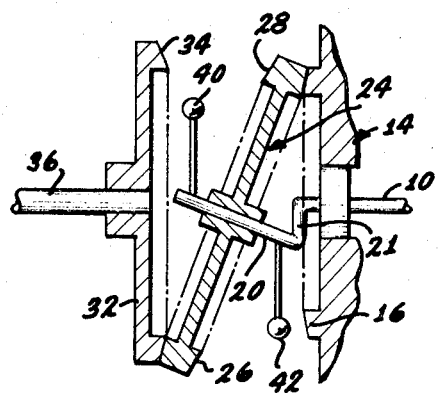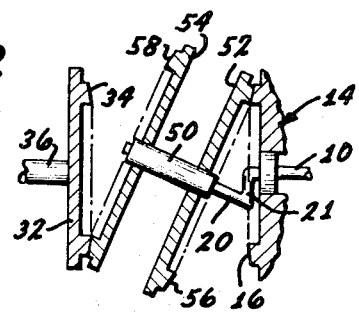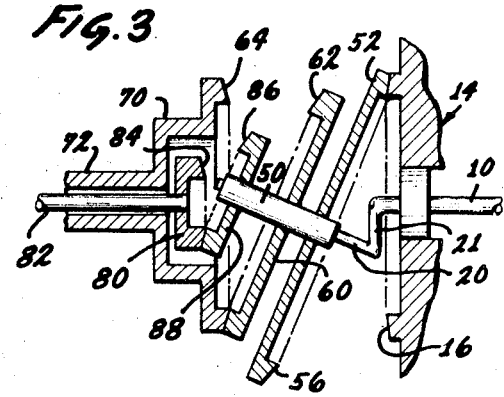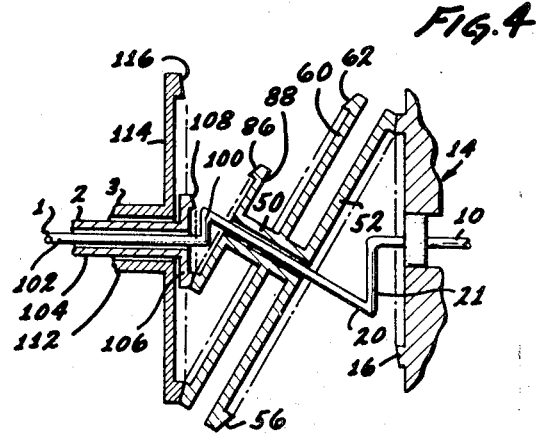
INVENTOR
PHILIP E. MASSIE

AXIAL GEAR TRAIN

This application is a continuation in part of application Ser. No. 822,462 filed May 7, 1969, and now U.S. Pat. No. 3,587,349.

SUMMARY OF THE INVENTION

The invention is a gear train of the axial type embodying improvements whereby the design of gear trains or transmissions having desired speed ratios is greatly facilitated.

Axial gear trains or transmissions of this type as conventionally known in the prior art comprise a drive shaft having a skew axle carrying a nutating or gyrating gear member or gear face. The nutating or gyrating gear member has a gear face that meshes with a fixed gear face and with another gear face on a driven gear.

The improvements of the herein invention comprise constructional arrangements which greatly facilitate the design of gear trains or transmissions having desired gear ratios and further, providing for simultaneously having available a plurality of different speed ratios, including 1:1 ratio.

The improved construction of the invention embodies certain distinguishing characteristics including that the skew axle is connected to the driving shaft by way of an offset which may be radial or which may be inclined at some other angle to the axis of the driving shaft. At least two gear faces are carried on the skew axle and they are axially spaced from each other along the skew axle. The centers of rotation of the gear faces carried on the skew axle are spaced radially from the axis of the driving shaft. With this construction, the design parameters for deriving the gear ratios are the numbers of teeth on the gear faces; the axial spacing of the nutating gear faces; and the amount of radial offset of the centers of rotation of the nutating gear faces from the axis of the driving shaft. With these parameters, a gear train or transmission having any desired speed ratio can readily and conveniently be designed.

The construction as set forth in the foregoing in addition readily adapts itself to the design of gear trains and transmissions having either very large gear ratios or relatively small gear ratios including a 1:1 ratio. It further adapts itself to gear trains or transmissions providing for a plurality of simultaneous different gear ratios, that is, driving speeds which may be utilized or taken advantage of by way of clutches.

In the light of the foregoing, a primary object of the invention is to achieve and realize a gear train or transmission having characteristics as outlined in the foregoing.

A further object is to make available an axial gear train or transmission having a skew shaft carrying nutating gear faces which are spaced axially from each other, the skew shaft being attached to the driving shaft by an offset.

Another object is to provide a gear train or transmission as described wherein the skew shaft is directly connected to an output shaft providing for a 1:1 speed ratio.

Another object is to provide a gear train or transmission as set forth in the foregoing wherein multiple gear faces are carried on the skew shaft providing for multiple output speed ratios.

The primary object of the invention is to provide an improved gear train which is axial and which utilizes a minimum number of gears but which is capable of very great speed changes, that is, stepped up changes or stepped down changes in speed, and which readily adapts itself to design for various speed ratios.

It is a further object to realize the characteristic in a type of device described wherein the speed changes are realized in a single stage of change.

Another object is to realize a device of the type described wherein multiple speed changes can be realized, including rotation in both positive and negative directions and in a 1:1 ratio.

Another object is to realize the characteristic in the device that there is no sliding friction as in hypoid gears; that there are no flexible members or wave generators involved; and that the gear and tooth forms are standard and subject to mass production by casting, cutting, grinding or hobbing. Further objects and additional advantages of the invention will become apparent with the following detailed description and annexed drawings wherein:

FIG. 1 is a sectional view of a basic preferred form of the invention;

FIG. 2 is a sectional view of a modified form of the invention;

FIG. 3 is a sectional view of another modified form of the invention;

FIG. 4 is a sectional view of another modified form of the invention;

FIG. 5 is a sectional view of a further modified form of the invention.

FIG. 6 is a sectional view of a further modified form of the invention.

Various exemplary forms or embodiments of the invention are disclosed herein. FIG. 1 shows a simplified illustrative exemplary form of the invention. In this form of the invention numeral 10 designates an input or drive shaft rotatable in the direction indicated by the arrow. The shaft 10 is journaled in a bearing mounted in a member or body 14 that does not rotate. The member 14 may be simply a gear that is fixed or held so as not to rotate having beveled teeth as designated at 16.

The shaft 10 has an angular axle portion 20 beyond bearing 12. The angle between the part 20 and the axis of the part of the shaft 10 might be 25° or 30°, for example. The amount of this angle will be explained more in detail hereinafter. Axle 20 is offset from shaft 10 by offset part 21.

Mounted on the shaft part 20, that is, journaled thereon is a double bevel gear 24 having bevel teeth 26 on one side and bevel teeth 28 on the other side. Because of the angle of axle 20 the gear 24 is positioned at an angle with respect to the gear 14 such that its teeth 26 mesh with the teeth 16 on the gear 14. The angle of bevel on the teeth is not critical but is accommodated to the angle between the shaft portion 20 and the shaft 10. The teeth 28 are like the teeth 26 having a similar angle of bevel. The gears and the tooth forms on them may be standard commercially available gears subject to mass production by casting, cutting, grinding or hobbing. As will be observed, when the driven or input shaft 10 rotates thus rotating the angular part 20 the tilted position of gear 24 changes such that the point of contact between gear 24 and gear 14 rotates around the axis of shaft 10. The significance of this will be made clear presently. Gear 24 is a nutating gear. Offset 21 is opposite the point of contact of teeth 26 and teeth 16, but it can be on the same side. For computation purposes, the opposite position is considered positive and the "same" side negative.

Numeral 32 designates another similar gear having beveled teeth 34. This gear is on a shaft, that is, an output or driven shaft 36. The shafts 10 and 36 are axially aligned and the gears 14 and 32 are spaced so that the teeth 26 on gear 24 mesh with teeth 16 of gear 14 whereas the teeth 28 of bevel gear 24 mesh with the teeth 34 of gear 32.

As explained in the foregoing, the primary purpose of the gear train described is to provide for having speed changing gear ratios particularly for purposes of speed reduction wherein very substantial gear ratios are realized in a very simple mechanism using a minimum number of gears.

As the shaft 10 rotates the point of contact between teeth 28 and 34 rotates around the gear 34, this point being 180° displaced from the point of contact between teeth 26 and teeth 16. The effect of the arrangement shown in FIG. 1 is to produce a substantial speed reduction. This is achieved by way of predetermined ratios as between the number of teeth on the respective gears. So if gear 24 rotates in the same direction as shaft 10, the rotation it imparts to gear 32 is positive, the net being the resultant of the rotations.

With high rates of rotation of the shaft 10, the inclined axial or shaft part 20 should be dynamically balanced with respect to the input shaft. Thus, fly weights can be added as shown 40 and 42. This does not relieve the centrifugal turning force on the gear that tends to disengage it from the mating gears. This can be circumvented only by rigid construction of the gear, except as stated hereinafter.

FIG. 2 shows a further modified form of the invention. In this form of the invention, shaft portion 20 is extended and carries tube shaft 50 and provided on it are two bevel gears 52 and 54 which are spaced apart, the gear 52 having teeth 56 that mesh with the teeth 16 and the gear 54 having teeth 58 that mesh with the teeth 34. The spacing between gears 52 and 54 is such that the center of gear 52 is below or offset one way from the axis of the aligned shafts 10 and 36 while the center of gear 54 is above or offset the other way from the axis of the aligned shafts 10 and 36. Thus, the configuration is such that gear 52 can be larger than gear 14, and therefore, have more teeth. Gear 54 is of the same size as gear 52 but is larger than the gear 32. Thus, the drive as between gears 14 and 52 is from a smaller to a larger gear and the drive as between gears 54 and 32 is from a larger to a smaller gear. The principles illustrated by the foregoing examples apply and thus, it will be observed that the relative ratios of teeth can be adjusted to provide for desired reductions in speed of the output gear 32. Gears 52 and 54 may be of different rather than the same size.

It will be observed that gears 52 and 54 are two coupled nutating gears in which the space between gears may be varied to suit mechanical design or gear ratio. (mounted on an inclined shaft) There is an offset of the "center" (tooth plane intersected by gear axis) of each nutating gear, separately, either "-side" of the principle axis of the system (main shafts). The two nutating gears are in parallel planes on a common inclined shaft. The placement of the "center" of the nutating gears on the same (either) side or on opposite sides of the principle system axis, is possible. The pair of nutating gears may have the axial space between them varied to vary the input to output ratio of the gear system. The point defined by the intersection of the plane of the gear teeth and the axis of the gear, hereafter referred to as the center of the gear, for each nutating gear, may be radially displaced from the axis of the primary shaft 10 in either of two directions, to be defined hereinafter. Bevel (face) gear 14 is rigidly mounted to the primary structure in a nonrotating manner and is mounted coaxial to the primary shaft. The first nutating gear 52 engages the fixed gear 16 such that as the primary shaft 10 is rotated, the inclined shaft 50 rotates and the point of contact between gears 16 and 52 rotates about the axis of the system and the face of gear 52.

A second shaft 36 is disposed axial with the primary shaft 10 and is rotatable with respect to the primary structure. A bevel gear 32 is mounted on the second shaft, so disposed as to engage the teeth on the second nutating gear 54. The gears are so disposed that as the primary shaft 10 and the inclined shaft 50 are rotated, the point of contact between gears 54 and 32 rotates about the system and the axis of gear 32. Thus, as the primary shaft 10 is rotated, the inclined shaft 50 is caused to rotate and the points of contact between gears 14 and 52 and gears 54 and 32 rotate about the axis of the system. Gears 52 and 54 are constrained to rotate together by means of the connecting coupling shaft 50. The offset of the center of the two nutating gears and the axial space between the nutating gears along the hollow shaft 50 is defined in a plane described as passing through the axis of the primary shaft 10, the second shaft 36, the coupling shaft 50, and the points of contact between gears 14 and 52 and gears 32 and 54. In this plane, the center of each nutating gear independently may be displaced from the axis of the primary shaft 10 and the axis of the system, either toward the point of contact between the nutating gear and the mating gear or away from it, or may have no displacement (offset). Since the gears may have independent offsets along the inclined shaft 50, which is at a fixed angle, the spacing between the nutating gears and the length of hollow shaft 50 is variable for various design gear requirements.

The purpose of the gear train is to produce a proportional relation between the rotation of shaft 10 and shaft 36. This proportion can have a positive (same direction) or negative (reverse or opposite direction) value. By having different numbers of teeth on the gears 14, 52, 54, 134, and 32, the magnitude and direction of the rotational proportion can be varied according to the equation, $$R = 1 - [N(14) \times N(134)]/[(54) \times N(32)]$$

Where $N(\text{---})$ designates the number of teeth on the respective gear. $R$ is the number of turns of shaft 36 for each turn of shaft 10, a number much less than one for high ratio stepdown gearing. A shorthand notation for the rotation ratio equation is $$R = 1 - AC/BD \quad (A, B, C, \text{ and } D \text{ are gear diameters})$$

A variation of the form recognizes that gear ratios are normally expressed as a larger number to one, i.e., 10 to 1 ratio. Using $Q$ to express this larger number, the equation for $Q$ is:

$$Q = 1/R = BD/BD - AC$$

For illustrative purposes a form of FIG. 1 may be considered wherein the number of gear teeth (or radius or diameter or circumference of gears, all the same) passing the two points of contact (P.C.) between the gears 14(A), 28-right (B), 28-left (C) and 32(D). For one revolution of the crank, the number of teeth making contact between $A$ and $B$ is equal to $A$. Thus, at the end of the same revolution, the number of teeth making contact between $C$ and $D$ is equal to $A$, since both points of contact complete one revolution and have "$A$" teeth in contact. Thus, the gear $D$ has moved by the difference in the number of teeth (or diameter $x \pi$) between $A$ and $D$, or $D-A$. The part of a revolution completed by $D$ in this one revolution of the crank is $D-A/D$. The gear ratio in FIG. 1 is then:

$$R = D - A/D$$

and $Q$, the larger number of a $N$ to 1 gear ratio is:

$$Q = D/D - A.$$

Considering FIG. 2 the equation is the same, except, the number of teeth on $A$ is multiplied by the ratio of $B(52)$ to $C(54)$ or:

$$R = \frac{D - \frac{AC}{B}}{D} = \frac{BD - AC}{BD} \quad \text{and}$$

$$Q = BD/(BD - AC)$$

This can be manipulated in many forms for design purposes. The following conventions are used. $H$ is the offset of gear $B$ from the axis of the system and is positive when the offset is on the opposite side of the axis from the point of contact, $A$ to $B$. $J$ is the offset of $C$ from the axis of the system and is positive when on the opposite side of the axis from the point of contact, $C$ to $D$. Definitions:

$K$ is the cosine of the angle of the inclined shaft.

$S$ is the *horizontal* (or system axial) distance between the centers of $B$ and $C$.

$\$$ is $S$ sin of the angle $= H+K$.

$S/K$ is the space between the centers of $B$ and $C$ along the inclined axis.

$B$ and $C$ can be transformed into the plane of $A$ and $D$ by multiplying by $K$. $B' = KB$, $C' = KC$ Now, consider the gear equation, $$R = 1 - AC/BD = 1/Q$$

If $AC/BD$ is greater than 1, $R$ is negative and the system is reversing.

If $AC/BD$ is very close to 1, either positive or negative, $R$ is very small and the gear ratio is very large $Q$).

If $AC/BD$ approaches 0, $R$ approaches 1 and approaches the direct drive value.

Now: $B' = A+2H$, and $C' = D+2J$

If the fraction is multiplied by $K/K$, $$R = 1 - A \, KC/D \, KB = 1 - A \, C'/D \, B' = 1 - A(D+2J)/D(A+2H)$$

It is now apparent that the gear train design can be performed in terms of the four variables, $A$, $D$, $J$ and $H$. $J$ and $H$ may be positive or negative but $-J$ cannot be larger than $H$. ($B$ and $C$ move past each other.) As $J$ and $H$ are varied, $S$ and $SK$ vary.

This becomes a four-variable problem for a single ratio (solution). The gear ratio can be varied by changing any one of the four variables. The four variables have been treated as abstract numbers here. Practical gear design will place some limitations on this.

FIG. 3 shows another form of the invention wherein the same gear train is set up to provide for two output shafts, one rotating in one direction and one in the other. The shaft 10 has the angular part 20 on which is journaled gearwheel 52 which has a set of bevel teeth 56 on one side which mesh with the teeth 16 on the gear 14. On the shaft part 50 is another bevel gear 60 having teeth 62 meshing with teeth 64 of output cup gear 70 with hub 72, gear 70 having hub 72 to accommodate output gear 80 on shaft 82 which is telescoped inside of shaft head 72. Gear 80 has teeth 84 meshing with teeth 86 on another gear 88 on axle 50. Gears 88 and 80 are smaller than gears 60 and 70. Gears 52, 60 and 88 are axially spaced so that the characteristics of the embodiment of FIG. 2 are realized with two output shafts.

In this form of the invention there are two output shafts 72 and 82 which are concentric, one being telescoped within the other and which can cooperate with clutch means so that either one or the other can be coupled, that is, clutched to a load. It may be observed in the structure of FIG. 3 that the ratio as between the numbers of teeth on the pairs of gears may be as in the examples set forth in detail in the foregoing. Thus, it may be observed that with the output gears 80 and 72 of different sizes the ratios of numbers of teeth can be readily adjusted so that one output gear rotates in one direction and one in the opposite direction for the same direction of rotation of the input shaft 10.

In FIG. 3, $H$ is positive for gear $52(B)$. $J$ is negative for gear $60(C-1)$ and positive for gear $88(C-2)$. If the ratio $(D+2J)/D$ is larger than the ratio $(A+2H)/A$, the total fraction is greater than 1 and $R$ is negative. It is obvious (but not always practical) that by suitable choice of values, either gears 60–70 or 88–80 can be reversing and the other nonreversing.

FIG. 4 shows a modified form of the invention wherein it is desired to obtain three different speed ratios such as designated on this figure. These ratios include a 1:1 ratio, the design of FIG. 4 being particularly arranged to design of FIG. 4 being particularly arranged to achieve this ratio. Parts in this figure that are the same as or correspond to similar parts in preceding figures are identified by the same reference numerals. It will be observed that, referring to the shaft 10 in addition to the offset 21, there is a further offset 100 with a shaft part 102 extending from it which is aligned with the shaft 10. Either shaft 10 or shaft 102 can be considered the input shaft with the other the output since the mechanism is completely reversible. Shaft 102 rotates at the first of the three speeds. Tubular shaft 104 is on gear 106 which has teeth 108 that mesh with teeth 86 on gear 88. Shaft 104 is the second speed shaft. Tubular shaft 112 is on gear 114 having teeth 116 that mesh with teeth 62 on gear 60. Thus, from the foregoing, it will be readily observed that the design arrangement of FIG. 4 is one which practically realizes three different speeds, one of which is at a ratio of 1:1.

FIG. 5 is a specific design or embodiment constituting a practical form of an automobile transmission providing speed ratios forward of 1:1, 1.8:1, and 3.2:1 and in reverse of −3.2:1. The difference in shape or configuration of the structure of this figure from other figures results from the fact of it providing for the relatively low ratios of speed change. The 1:1 ratio is provided as in FIG. 4. Parts that are the same as or correspond to similar parts in previous embodiments are identified by the same reference numerals. With respect to the construction of FIG. 4, one additional speed ratio is provided which is the positive 3.2:1 ratio illustrated on the figure. For achieving the ratios of FIG. 5, it will be observed that the offsets 21 and 100 are not normal to the axis of the shafts 10 and 102, but rather they are inclined at an angle as shown.

There is an additional cup gear identified by the numeral 120 having a telescoping hub part 122 which surrounds the telescoping hub 112 that is on the gear 114. The cup gear 120 has teeth 124. The gear identified at 52' having a face or teeth 56 has on the opposite side, of a smaller diameter, another set of teeth identified at 126 and teeth 124 on cup gear 120 mesh with these teeth 126. Thus, with this construction as described and in the manner explained four output speed ratios are realized.

In FIG. 5, the weights 40–42 are positioned to provide an angular moment on shaft 20 tending to increase the engagement pressure of the gear teeth at the points of contact as the speed increases. This is applied to all meshing gear faces. The fly weights oppose any tendency of the shaft to bend.

FIG. 6 shows a further modification of the invention which carries forward the principles of the device of FIG. 5 into further multiple speeds. The device of FIG. 6 provides simultaneous outputs at six different speeds as identified at the left part of the figure. Parts that are the same as or similar parts in previous embodiments are identified by the same reference numerals. Some of these numerals are primed, or double primed. The fixed gear face member 14' has two gear faces identified at 16' and 16". The hollow inclined axle or shaft 50' corresponds to that of previous embodiments, and it carries gears including the gear 52 which meshes with the gear face 16' and the gears 60' and 88. The gear 60' has two gear faces of different diameter identified at 62' and 62" and these gear faces mesh with gear faces on gears identified at 114' and 114". The gears 108, 114, and 114" produce the second, third, and fourth output speeds by way of the tubular shafts 104, 112, and 112'.

Numeral 130 designates a further hollow shaft which is journaled on the inclined hollow shaft 50'. It carries a gear 132 having teeth 134 that mesh with the teeth 16". It carries another gear 138 having teeth 140 that mesh with teeth 142 on a gear 144 having a tubular hub shaft 146 which is representative of the sixth output speed. The hub 130 carries another gear 150 having teeth 152 which mesh with teeth 154 on a gear 156 having a tubular hub shaft 158 which is representative of the fifth speed of the six different speeds. Thus, as may be seen, the invention is adaptable to speed changers or transmissions capable of various ratios of speed change. The embodiment of FIG. 5 is particularly adaptable as an automobile transmission having four speeds, including the reverse speed. These devices are of course adaptable as automatic transmissions for purposes of drive, individual output shafts being connected to the drive by way of electric clutches. As previously mentioned, the input and output are interchangeable since the devices are reversible and can operate in either direction for producing higher or lower speeds.

From the foregoing those skilled in the art will understand the nature and construction of the invention and the manner in which it achieves and realizes all of the objects and advantages as set forth in the foregoing as well as the many additional advantages that are apparent from the detailed description.

The foregoing disclosure is representative of preferred forms of the invention and is to be interpreted in an illustrative rather than a limiting sense, the invention to be accorded the full scope of the claims appended hereto.

What is claimed is:

1. A speed changer of the character described comprising: a rotatable drive shaft; at least one driven shaft; a fixed gear face having a center which is concentric with the drive shaft; the drive shaft having a skew axle; a rotor having a second gear face meshing with said fixed gear face rotatable on said skew axle; an offset shaft portion connecting said drive shaft and skew axle, the skew axle being angularly inclined; means providing a third gear face rotatable about said skew axle; means providing a fourth gear face which is carried by said driven shaft, said fourth gear face meshing with said third gear face.

2. A speed changer as in claim 1, wherein said drive and driven shafts are axially aligned.

3. A speed changer as in claim 1, wherein the center of said rotor is displaced from the axis of the drive shaft.

4. A speed changer as in claim 1, wherein said second and third gear faces are axially spaced from each other along the axis of the said axle.

5. A speed changer as in claim 4, wherein the center of said second gear face is displaced in a direction away from the axis of the drive shaft from its point of contact with the first gear face and the center of rotation of the third gear face as displaced away from the axis of the drive shaft in a direction from its point of contact with the fourth gear face, the two displacements being opposite to each other.

6. A speed changer as in claim 1, including a plurality of gear faces formed to rotate relative to said axle and being axially spaced from each other, fixed gears meshing with certain of said plurality of gear faces and rotating gear faces meshing with others of said plurality of gear faces.

7. A speed changer as in claim 6, including a plurality of output gear faces of different sizes rotatable about the axis of the output shaft and each of these gear faces meshing with a gear face rotatable about said axle.

8. A speed changer as in claim 1, having an output shaft directly connected to the drive shaft to be rotated thereby at the same speed.

9. A speed changing device as in claim 1, including means providing a plurality of gear faces coaxial with the drive shaft which do not rotate and means providing a plurality of gear, faces of different diameters rotatable about said axle, meshing with said nonrotating gear faces.

10. A speed changer as in claim 1, comprising a rotor means on said axle, said rotor means having a plurality of gear faces of different diameter on the same side therewith and rotors rotatable about the axis of the driven shaft having gear faces meshing with said gear faces on said rotor on said axle.

11. A speed changer as in claim 10, including a relatively elongated hub rotatable on said axle, said hub carrying rotors having gear faces, a second hub rotatable about said first hub, said second hub carrying rotors having gear faces thereon.

12. A speed changer as in claim 1, having flyweights carried by said drive shaft and axle whereby to counterbalance centrifugal forces set up by the rotor means carrying the gear faces.

* * * * *